(12) United States Patent
Frank, Jr. et al.

(10) Patent No.: US 6,359,779 B1
(45) Date of Patent: Mar. 19, 2002

(54) INTEGRATED COMPUTER MODULE WITH AIRFLOW ACCELERATOR

(75) Inventors: Charles W. Frank, Jr., Irvine; Thomas D. Hanan; Wally Szeremeta, both of Mission Viejo, all of CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/286,501

(22) Filed: Apr. 5, 1999

(51) Int. Cl.[7] .............................. G06F 1/16; H05K 7/20
(52) U.S. Cl. .................... 361/687; 361/685; 361/686
(58) Field of Search ................................ 361/688, 690, 361/691, 694, 695, 697, 703, 687, 686

(56) References Cited

U.S. PATENT DOCUMENTS

| | | | | |
|---|---|---|---|---|
| 5,091,823 A | * | 2/1992 | Kanbara et al. ............. | 361/384 |
| 5,171,183 A | * | 12/1992 | Pollard et al. ............... | 454/184 |
| 5,247,427 A | * | 9/1993 | Driscoll et al. .............. | 361/685 |
| 5,361,188 A | | 11/1994 | Kondou et al. | |
| 5,375,038 A | | 12/1994 | Hardt | |
| 5,428,503 A | | 6/1995 | Matsushima et al. | |
| 5,432,674 A | * | 7/1995 | Hardt .......................... | 361/694 |
| 5,463,742 A | | 10/1995 | Kobayashi | |
| 5,515,515 A | * | 5/1996 | Kennedy et al. ............. | 395/283 |
| 5,550,710 A | | 8/1996 | Rahamim et al. | |
| 5,563,768 A | * | 10/1996 | Perdue ......................... | 361/695 |
| 5,644,472 A | * | 7/1997 | Klein ........................... | 361/695 |
| 5,680,295 A | * | 10/1997 | Le et al. ...................... | 361/695 |
| 5,682,291 A | * | 10/1997 | Jeffries et al. .............. | 361/1.85 |
| 5,689,403 A | * | 11/1997 | Robertson, Jr. et al. ..... | 361/695 |
| 5,691,883 A | * | 11/1997 | Nelson ........................ | 361/697 |
| 5,694,294 A | * | 12/1997 | Ohashi et al. ............... | 361/687 |
| 5,963,424 A | * | 10/1999 | Hileman et al. ............. | 361/695 |
| 6,011,687 A | * | 1/2000 | Gluskoter et al. ........... | 361/686 |
| 6,058,009 A | * | 5/2000 | Hood, III et al. ............ | 361/687 |
| 6,069,792 A | * | 5/2000 | Nelik ........................... | 361/687 |
| 6,084,769 A | * | 7/2000 | Moore et al. ................ | 361/687 |
| 6,094,345 A | * | 7/2000 | Diemunsch .................. | 361/695 |
| 6,094,347 A | * | 7/2000 | Bhatia ......................... | 361/695 |
| 6,188,573 B1 | * | 2/2001 | Urita ........................... | 361/687 |

* cited by examiner

Primary Examiner—Lynn D. Feild
(74) Attorney, Agent, or Firm—Milad G Shara

(57) ABSTRACT

The invention is an integrated computer module having a cooling tunnel which efficiently cools a microprocessor or other heat generating component on a main PCBA inside of the module. The module includes its own cooling fan so that the module can safely and effectively operate with high power microprocessors which generate significant amounts of heat. A heat sink bonded to the microprocessor extends up into the cooling tunnel. A tapering section accelerates air leaving the cooling fan into the cooling tunnel such that the module may use a quieter, more cost effective cooling fan. The tapering section may be formed from a folded section of a ribbon cable which connects the main PCBA to the disk drive.

36 Claims, 13 Drawing Sheets

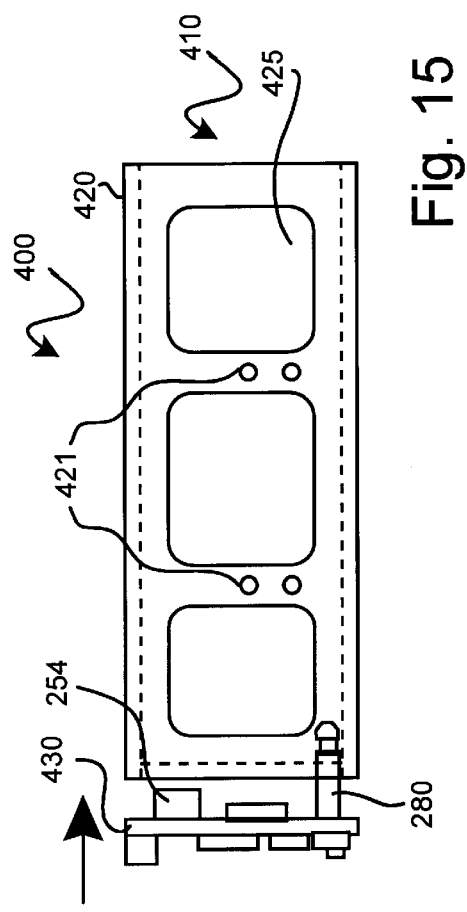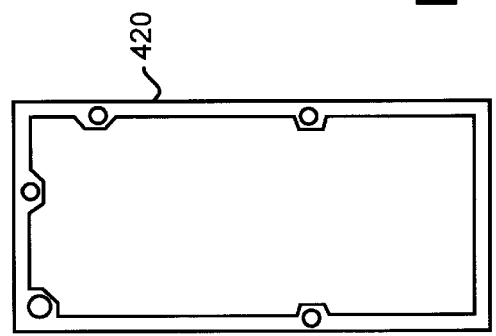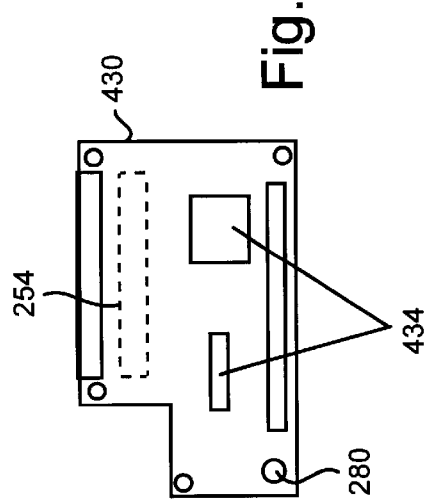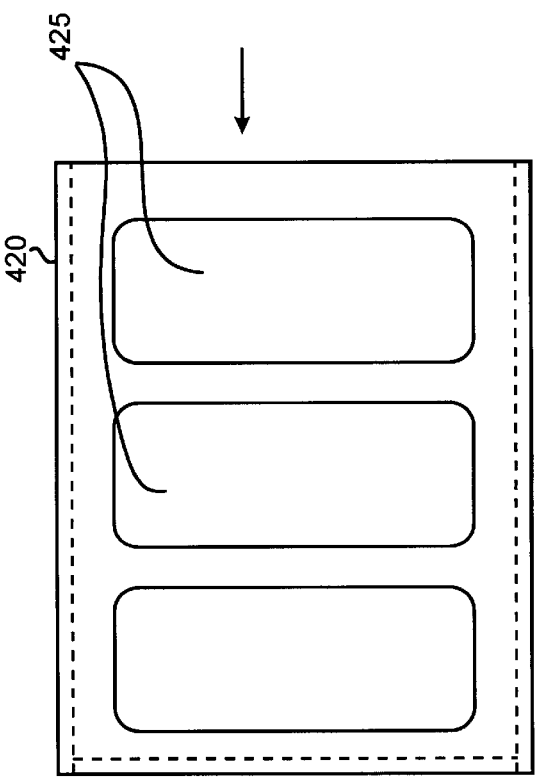

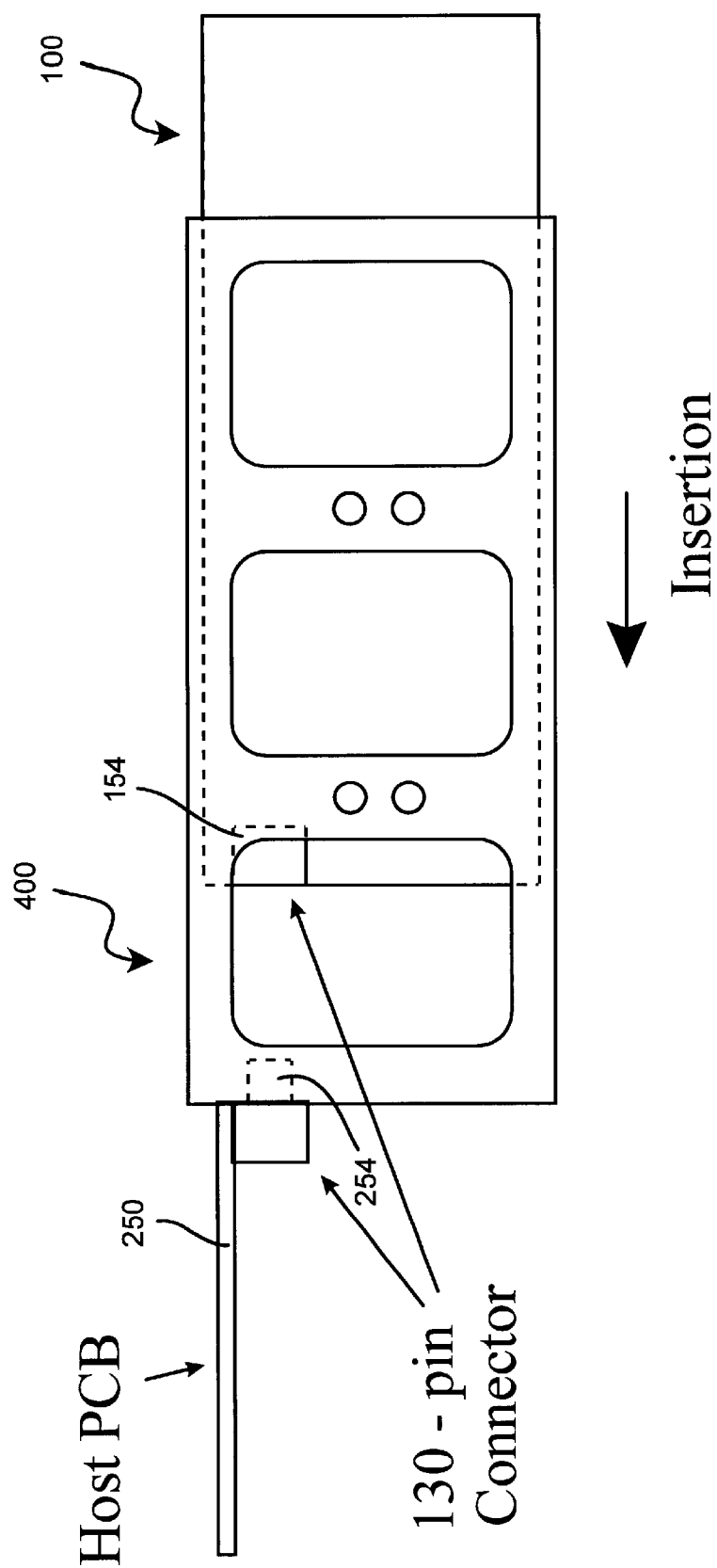

INTEGRATED COMPUTER MODULE WITH AIRFLOW ACCELERATOR

BACKGROUND OF THE INVENTION

1. Field of the invention

The invention relates generally to integrated computer modules and, more specifically, to an integrated computer module of compact construction which controls its own environment and efficiently cools its high power components by accelerating air within a cooling tunnel.

2. Description of the Related Art

Today's personal computers (PC's) are usually sold in a desktop configuration or a notebook configuration. Desktop PC's are generally housed in a relatively large chassis containing a main printed circuit board or "motherboard" and other components that are incorporated into or connected to the motherboard. The components may be located inside or outside of the chassis. Typical internal components include a power supply, a central processing unit (CPU), random access memory (RAM), a mass storage device such as a magnetic disk drive, expansion cards connected to a bus on the motherboard, and various peripherals mounted on "rails" in "bays" within the chassis and electrically connected to the motherboard or an associated expansion card by a ribbon cable or the like. Typical expansion cards are a SCSI adapter, a sound adapter, and a network adapter. Typical bay-mounted peripherals are a magnetic disk drive, a floppy drive, a tape drive or a CD-ROM drive. Typical external "peripherals" include user input devices such as a keyboard, a mouse, a microphone, a joystick, a graphics tablet or a scanner) and user output devices such as speakers a printer, and a video display device (e.g. a CRT display or an LCD display). The video adapter that controls the display, as with other adapters, may be integrated into the motherboard or provided on a separate expansion card.

The users of desktop PC's may be divided into two divergent groups: (1) experienced users who understand the individual components and tend to frequently upgrade their PC's by replacing such components, and (2) new users who do not understand or even want to understand the individual components. The latter group may prefer to replace the entire PC, if they upgrade at all. With respect to both groups, however, it has been observed that the need or desire to upgrade occurs far sooner with respect to some components than with respect to other components. In particular, users more frequently upgrade the CPU, the RAM, the magnetic disk drive, and the video adapter. These upgrades tend to provide more capacity and more speed because of rapid technological advancements on the part of manufacturers in response to ever-increasing demands from ever more complicated and more graphics intensive software applications and an associated increase in file sizes. Both user-types less frequently need or desire to upgrade the monitor, the speakers, the keyboard or the power supply, however, because these latter components have withstood the test of time and employ technologies that are less prone to obsolescence.

These inventors expect that the computer paradigm will move from a large chassis full of individual components of different manufacture toward a readily upgraded system consisting of two primary components: (1) an integrated computer module that compactly houses the frequently upgraded components (e.g. the CPU, the memory, the disk drive, and the video adapter) and provides a module connector for interfacing the module's electronics with peripherals, and (2) a "host assembly" with a docking bay that receives the module and provides a host connector that mates with the module connector. The host assembly can comprise any "shell" that includes the bay that receives the integrated computer module. The docking bay may be in a host assembly that doubles as a peripheral or in an intermediate assembly that is connected to conventional peripherals. The host assembly, for example, may function and appear generally like a conventional CRT display, save for the addition of the docking bay. A CRT-like host assembly of this nature would also provide a first connector for receiving input from a keyboard and, in all likelihood, a second connector for receiving input from a mouse. As another example, the host assembly may appear like a conventional tower chassis that contains a docking bay for receiving the module, and suitable electronics (e.g. a PCB, cables, and so on) to interface the integrated computer module to conventional expansion cards via an expansion bus, and to conventional peripherals like a display, a keyboard, and a mouse, via connector ports built-in to the host assembly or carried by an expansion card.

There are a number challenges associated with packing computer components and storage capability into a small integrated computer module. One such challenge is maintaining safe operating temperatures given a microprocessor and other components that dissipate relatively high levels of power.

Computer modules and associated bays have already been proposed. For example, in U.S. Pat. No. 5,463,742 that issued to Kobayashi in 1995, assigned to Hitachi, the inventor discloses a "personal processor module" (PPM) that fits within a notebook type docking station or a desktop type docking station, or simply attaches to a docking housing 6 that is cabled to a keyboard and a monitor. (See FIG. 1). The '742 Patent discloses an embodiment in FIGS. 6 and 7 where a magnetic disk drive and a PCB which carries a microprocessor are situated in a in an enclosure having air flow openings. The air flow openings are associated with shutters that are biased in a closed position, but open when the PPM is inserted. The PPM disclosed in the '742 Patent, however, relies entirely upon a cooling fan contained in the docking station.

In U.S. Pat. No. 5,550,710 that issued in 1996 to Rahamim et al., also assigned to Hitachi, the inventors also disclose a PPM involving a disk drive and a main PCB. The '710 Patent, however, focuses on a passive cooling structure involving a "liquid heatsink" which thermally couples heat generating components to the case.

There remains a need, therefore, for an integrated computer module with a simple, rugged mechanism for independently and effectively cooling the heat generating components contained therein.

SUMMARY OF THE INVENTION

In a first aspect, the invention may be regarded as an integrated computer module adapted for removable insertion into a docking bay within a host assembly, and upon such insertion for connecting to a host connector, the integrated computer module comprising: an enclosure defined by a front wall, a back wall opposite the front wall, a first side wall, a second side wall opposite the first side wall, a floor wall, and a ceiling wall; a main printed circuit board assembly (main PCBA) located in the enclosure, the main PCBA including a microprocessor dissipating heat; a module connector electrically connected to the main PCBA and supported at the enclosure's back wall for connection to the host connector upon insertion of the integrated module into the docking bay in the host assembly; a plurality of front and back cooling apertures in the front and back walls of the enclosure, respectively; a cooling tunnel located between the plurality of front and back cooling apertures; a cooling fan located adjacent to the plurality of front cooling apertures, the cooling fan having an exit profile of a first area, the cooling tunnel having a tunnel profile of a second area that is smaller than the first area of the fan's exit profile; tapering means for accelerating cooling air that is flowing from the fan's exit profile into the cooling tunnel; and a heat sink bonded to the microprocessor and extending upward therefrom into the cooling tunnel through which the accelerated cooling air is passing.

In a second aspect, the invention may be regarded as an integrated computer module adapted for removable insertion into a docking bay within a host assembly, and upon such insertion for connecting to a host connector, the integrated computer module comprising: an enclosure defined by a front wall, a back wall opposite the front wall, a first side wall, a second side wall opposite the first side wall, a floor wall, and a ceiling wall; a main printed circuit board assembly (main PCBA) located in the enclosure, the main PCBA including a microprocessor dissipating heat; a module connector electrically connected to the main PCBA and supported at the enclosure's back wall for connection to the host connector upon insertion of the integrated module into the docking bay in the host assembly; a plurality of front and back cooling apertures in the front and back walls of the enclosure, respectively; a cooling tunnel located between the plurality of front and back cooling apertures, the cooling tunnel defined by the main PCBA., the ceiling wall, the first side wall, and a partition member with a vertical dimension that extends substantially between the main PCBA and the ceiling wall and a horizontal dimension that extends substantially between the front wall and the back wall.; a cooling fan located adjacent to the plurality of front cooling apertures, the cooling fan having an exit profile of a first area, the cooling tunnel having a tunnel profile of a second area that is smaller than the first area of the fan's exit profile; tapering means for accelerating cooling air that is flowing from the fan's exit profile into the cooling tunnel; and a heat sink bonded to the microprocessor and extending upward therefrom into the cooling tunnel through which the accelerated cooling air is passing.

BRIEF DESCRIPTION OF THE DRAWINGS

The just summarized invention may best be understood with reference to the Figures of which:

FIG. 14 is an elevational view of an adapter PCB for transforming a standard 5 ¼" peripheral bay of a conventional chassis into a docking bay according to this invention;

FIG. 15 is a side view of the adapter PCB of FIG. 14 and an associated adapter sleeve that is externally sized for insertion into a standard 5 ¼" drive bay and is internally sized for receiving an integrated computer module like the one shown in FIG. 1;

FIG. 16 is a top view of the adapter sleeve of FIG. 15;

FIG. 17 is a rear view of the adapter sleeve of FIG. 15; and

FIG. 18 is a side view of a preferred bay configuration (shown here in connection with an adapter sleeve) wherein the host connector is incorporated into the edge of a main host PCB;

DETAILED DESCRIPTION OF THE PREFERRED EMBODIMENT

A. The Integrated Computer Module

Figure 1:
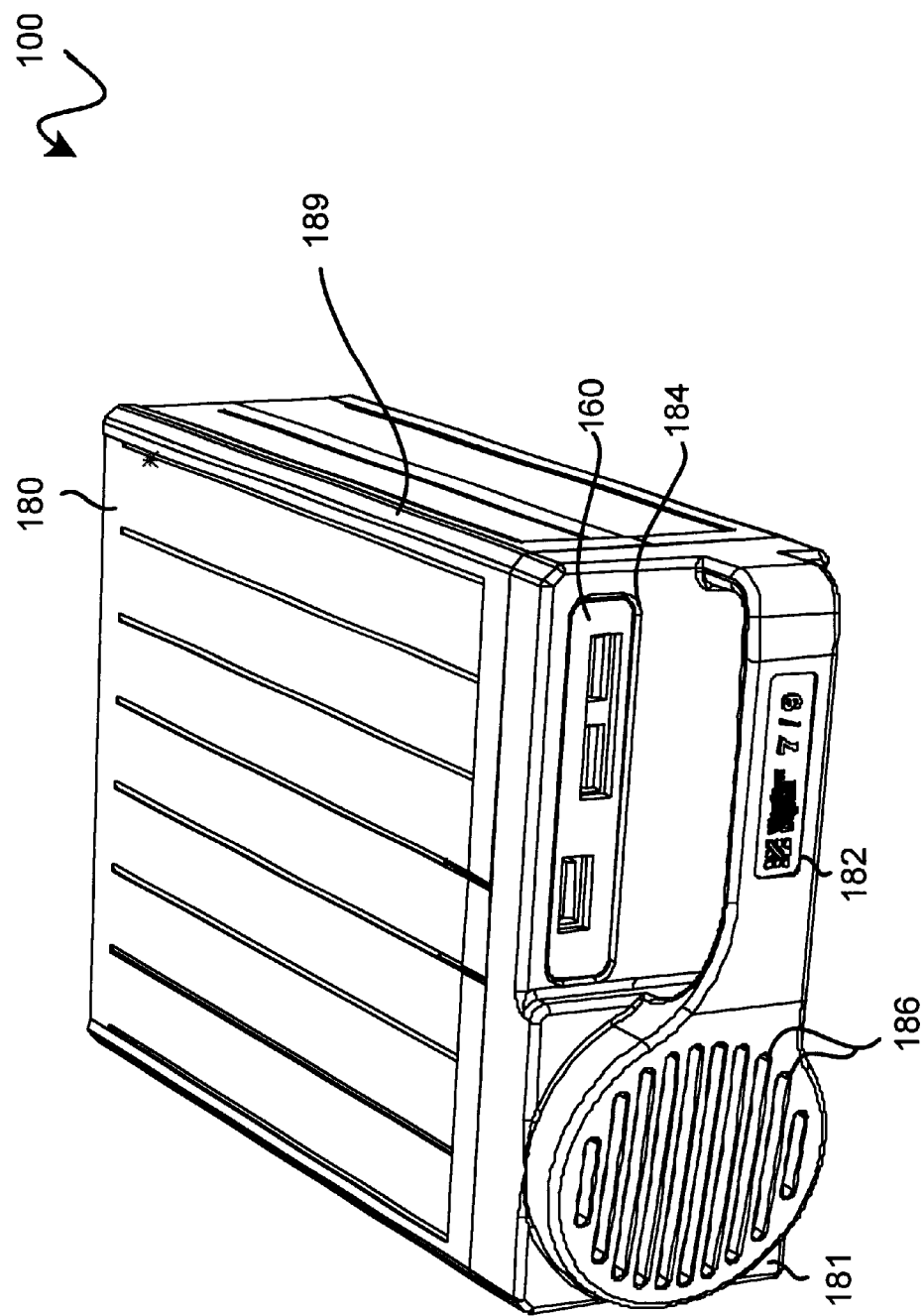
FIG. 1 is a perspective view of an integrated computer module that may be used with a host assembly according to this invention.

FIG. 1 shows an integrated computer module (ICM) 100 that may be used in a host assembly having a docking bay according to this invention. From a structural point of view, the ICM 100 generally comprises a metal enclosure (not shown in FIG. 1, but see FIG. 2) that may be aesthetically surrounded by a case comprising, for example, a sleeve 180 and an associated bezel or faceplate 181. The preferred faceplate 181 includes cooling apertures 186 and a handle 182 for carrying the ICM 100 and for pushing or pulling the ICM 100 into or out of a docking bay (not shown in FIG. 1). The preferred sleeve 180 includes at least one key feature such as chamfered edge 189 that mates with a corresponding key feature in the docking bay. In the example shown, key feature 189 comprises a chamfered edge along one corner of the substantially rectangular periphery of the sleeve 180 which mates with a corresponding chamfered corner 389 (shown in FIGS. 10, 11) of the docking bay. The sleeve 180 and faceplate 181 are preferably injection molded components made of any suitable material such as ABS, PVC, or engineered plastics.

The preferred ICM 100 of FIG. 1 also includes an aperture 184 in the faceplate 181 for exposing an optional PCI Mezzanine (PCM) card 160 that provides additional functionality such as an ethernet port, a SCSI port, or other desired function. A blank PCM cover plate (not shown) may be located in the aperture 184 in the absence of a PCM card 160.

Figure 2:
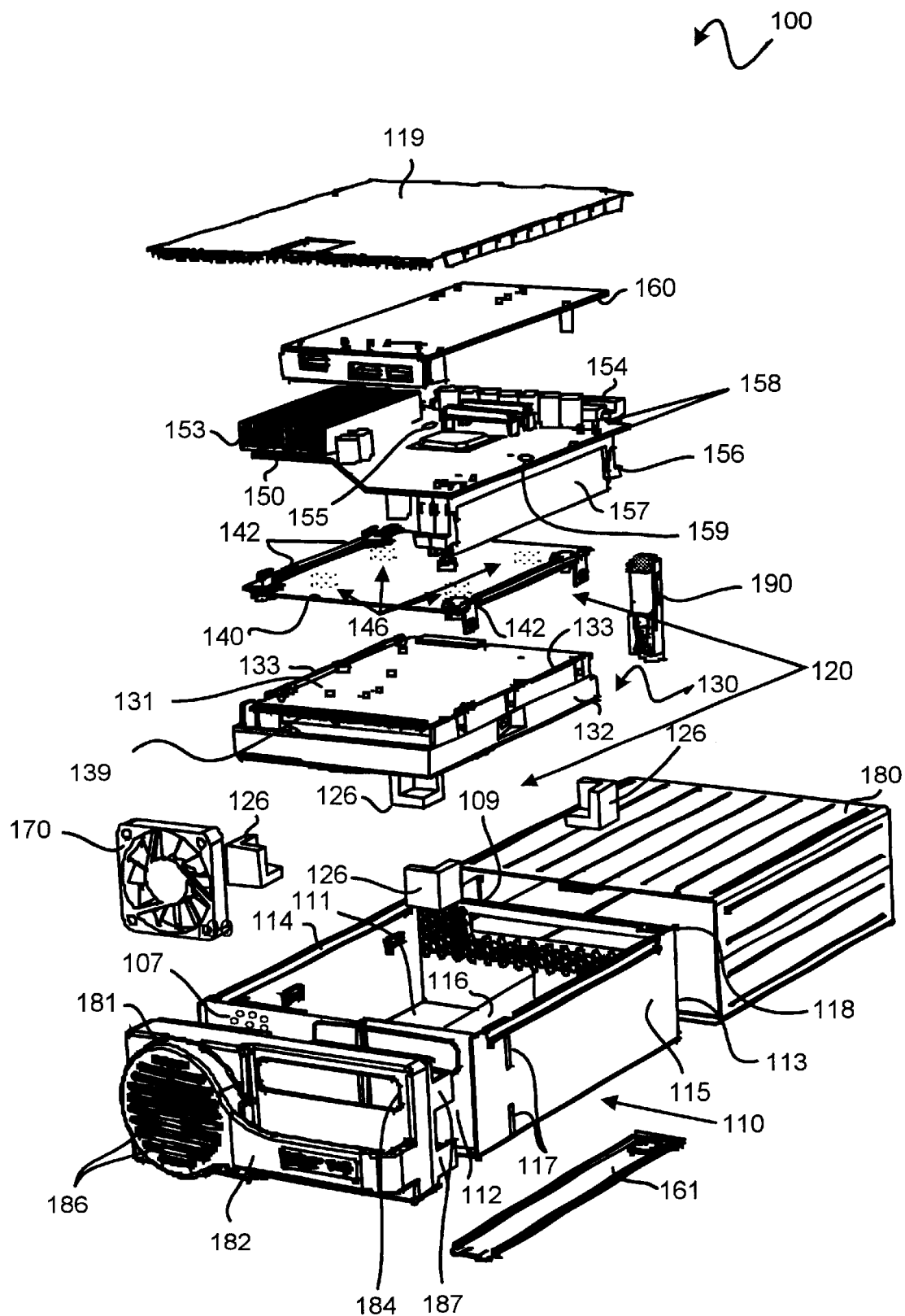
FIG. 2 is an exploded view of the integrated computer module of FIG. 1.

FIG. 2 is an exploded view of the ICM 100 of FIG. 1, showing the presently preferred construction in more detail.

The ICM 100 is designed so that it can be assembled by hand or more efficiently, and more cost effectively assembled using automated assembly techniques. In particular, the components of the preferred ICM 100 are generally assembled, from above, into an open-top case or "tub" 110. The preferred ICM 100, in other words, is assembled in a successively stacked, layer by layer arrangement. The tub 110 and all of the components therein are ultimately covered with a ceiling wall 119 and then, if appropriate for the desired application, enclosed in the sleeve 180 and faceplate 181 that form the outer case shown in FIG. 1. The preferred ceiling wall 119 makes a snap-on connection to the tub 110 to speed assembly and eliminate the necessity for any threaded fasteners or the like.

The tub 110 has a floor wall 111, a front wall 112, back wall 113 opposite the front wall, a first side wall 114, and a second side wall 115 opposite the first side wall. In order to define a space sized for receiving a disk drive 130, an intermediate wall 116 is also provided between the first side wall 114 and the second side wall 115. The tub 100 includes front and rear cooling apertures indicated at 107, 109 in the front and back walls respectively for passage of cooling air. The tub 110 is designed to minimize leakage of electromagnetic interference (EMI) in accordance with FCC requirements. Accordingly, the tub 110 and associated ceiling wall 119 are metallic and the cooling apertures 107, 109 are sized and configured to meet the desired EMI requirements at the frequencies of interest.

The ICM's internal components generally include a shock mount system 120, a disk drive 130 that is supported in the shock mount system 120 and may have a controller PCBA 131 mounted on one side thereof, an intermediate plate 140, a main PCBA 150, and an optional PCM expansion card 160 as mentioned above. Preferably, the main PCBA 150 includes a microprocessor such as an Intel Pentium (not shown) located beneath a suitable heat sink 153, first and second memory module connectors 156 for holding memory modules 157 of a suitable type and desired capacity (e.g. Single Inline Memory Modules, or Dual Inline Memory Modules), and a module connector 154 for interfacing the overall ICM 100 to a host assembly. Collectively, the components mounted on the main PCBA 150 comprise substantially all the circuits needed for a computing subsystem. The ICM 100 further includes a locking mechanism 190 that engages a projecting member (discussed below) in the docking bay. The preferred locking mechanism 190 mechanically snaps into a corner of the tub 110 between an upper slot 118 and a lower slot (not shown).

In a final assembly process, the tub 110 and its interior components are encased in the sleeve 180 and the associated faceplate 181. As the faceplate 181 includes a handle 182 for carrying the entire ICM, it is important that the faceplate 181 have a secure, mechanical connection to the tub 110. The presently preferred construction for such a positive, mechanical connection comprises two pairs of backwardly-extending fingers 187 having inwardly extending detents (not shown), one pair on each side of the faceplate 181, and two corresponding pairs of slots 117 on the first and second side walls 114, 115 of the tub 110. As suggested by FIG. 2, the faceplate 181 is initially pressed onto the tub 110 until the detents on its fingers 187 engage the slots 117. Next, the tub 110 is inserted into the sleeve 180, the sleeve 180 thereby encasing the tub 110 and the fingers 187 so that they cannot splay outward and disengage from the slots 117.

Figure 8:
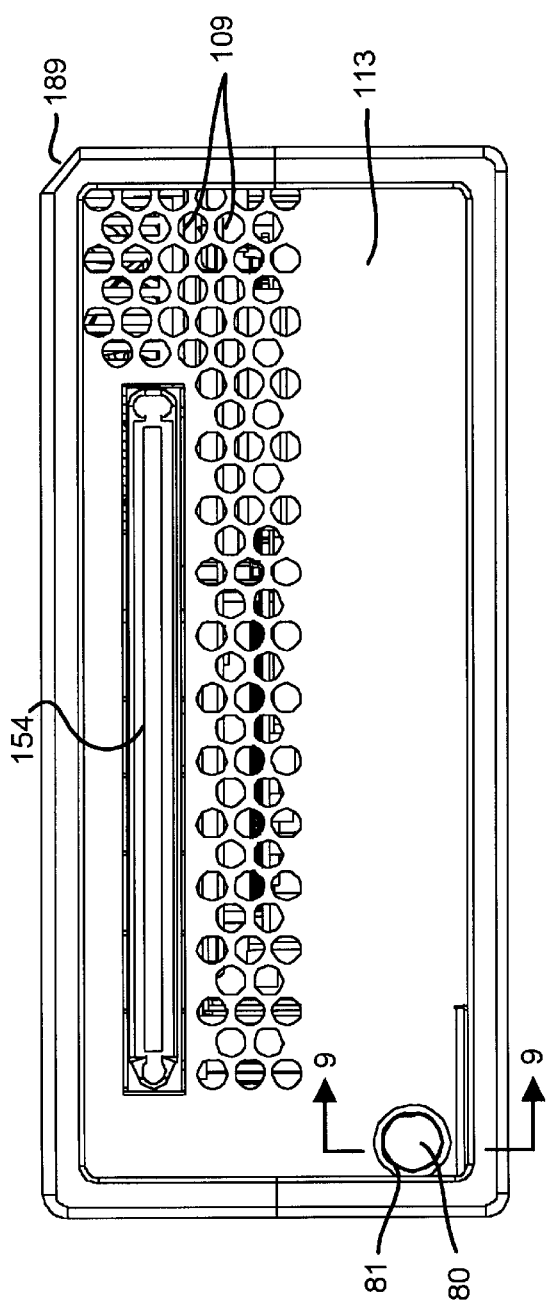
FIG. 8 is a rear view of the integrated computer module of FIG. 1.

FIG. 8 shows a rear view of a fully assembled ICM 100, the side that interfaces with a host assembly having a docking bay as described further below. As shown, substantially all of the back wall 113 is exposed at a rear end of the sleeve 180 to provide access to the module connector 154, the cooling apertures 109, and a module aperture 80.

Figure 9:
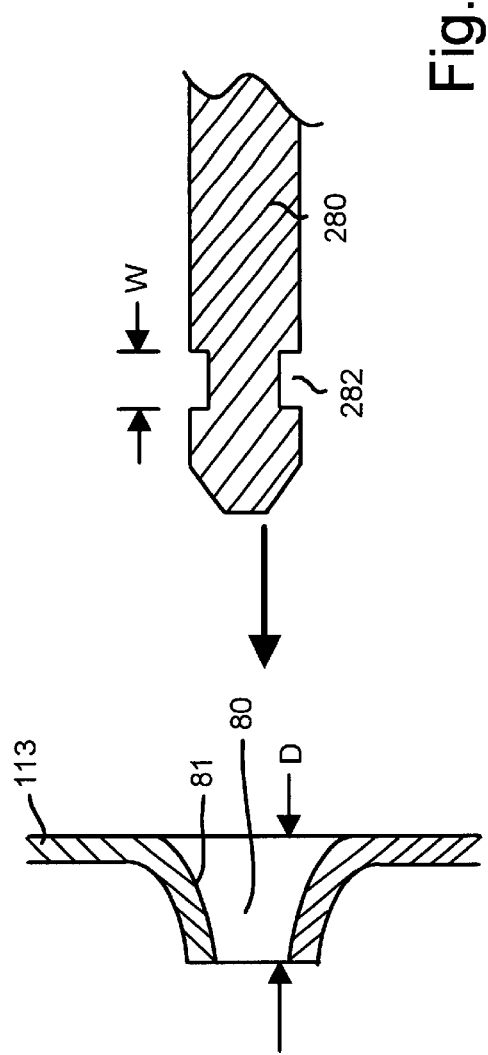
FIG. 9 is a section view of FIG. 8 taken along section lines 9—9.

FIG. 9 is a cross-sectional view of the preferred module aperture 80 in FIG. 8. In particular, FIG. 9 shows that the preferred module aperture 80 has radius edges 81 having a depth "D" that is greater than a width "W" of an annular groove 282 contained in a projecting member 280. We make "D" greater than "W" to ensure that the module aperture 80 does not accidentally hang up on the projecting member 280 as described more fully below in connection with the locking mechanism and the host assembly. The preferred module aperture 80 is formed by stamping or punching through the back wall 113.

Referring once more to FIG. 2, the preferred shock mount system 120 comprises four corner pieces 126 and four buttons 146 that are each formed from an elastomeric material, the preferred material being Sorbathane sold by Sorbathane, Inc. The corner pieces 126 each have a base and two intersecting, substantially perpendicular walls (not separately numbered) extending upwardly from the base (not separately numbered). During assembly, the corner pieces 126 are simply located with their bases on the floor wall 111 of the tub 110, and with their upstanding walls in the corners defined by the front wall 112, the back wall 113, the first side wall 114, and the intermediate wall 116. The upstanding walls of the corner pieces 126 are sized to provide a firm press fit relationship when compressed between the disk drive 130 and the surrounding walls 112, 113, 114, 116. The four button 146 are placed in wells (not shown) formed in the intermediate plate 140 to capture an opposite side of the disk drive 130 as described further below.

The presently preferred shock mounting system 120 requires us to orient the disk drive 130 with its controller board 131 facing upward, i.e. in a "board-up" orientation. The board-up orientation is preferred because it places the controller board 131 as close as possible to the main PCBA 150, thereby allowing a short cable with minimal signal degradation. A short cable is becoming increasingly important with higher data rates. In fact, given the ever increasing power of CPU's, it is now possible to control the disk drive via an ordinary expansion bus, such as the PCI bus, where a short cable may be critical. The board-up orientation is also preferred because the shock mounts 126 will not block access to the connectors 132 that are on the controller board 131. It is also desirable to mount the disk drive 130 board-up because the other side of the disk drive presents a clean, solid volume for contact with the shock mount system 120.

The disk drive 130, therefore, is oriented board side up and then pressed down onto and in between the four corner pieces. Next, the intermediate plate 140 is snapped into the tub 110, between the first side wall 114 and an intermediate wall 116, to firmly hold the disk drive 130 downward on the corner pieces 126. Note that the controller board 131 is recessed into the disk drive's aluminum casting 132, leaving a pair of elongated casting rails 133 extending up above the board 131. The upper shock mounts (elastomeric buttons) 146 are bonded to the intermediate plate 140. The buttons 146 press down against the elongated rails 133 of the casting 132. Consequently, the buttons 146 isolate the intermediate plate 140 from the rails 133, thereby enabling the shock mount system 120 to mechanically couple the disk drive 130 to the tub 110 via a shock-isolating, elastomeric interface.

The intermediate plate 140 also protects the disk drive's controller board 131 from electro-magnetic interference (EMI) emanating from the main PCBA 150. The main PCBA 150 transmits significant amounts of RF energy over a wide frequency spectrum because it has synchronously clocked components that operate at relatively high power levels (e.g. greater than 5 watts) and at a plurality of relatively high clock frequencies (e.g. 66 MHz, 100 MHz, 500 MHz, and so on). The disk drive's controller PCBA 131, on the other hand, contains circuitry that operates at relatively low millivolt levels that are associated with reading and writing data to and from the disk drive 130. The intermediate plate 140, therefore, beneficially functions as an EMI shield in addition to securing the disk drive 130 in the tub 110. The preferred plate 140 is made of the same metallic material as the remainder of the tub 110 so that it represents an intermediate ground plane that tends to arrest conducted and radiated RF energy.

Figure 3:
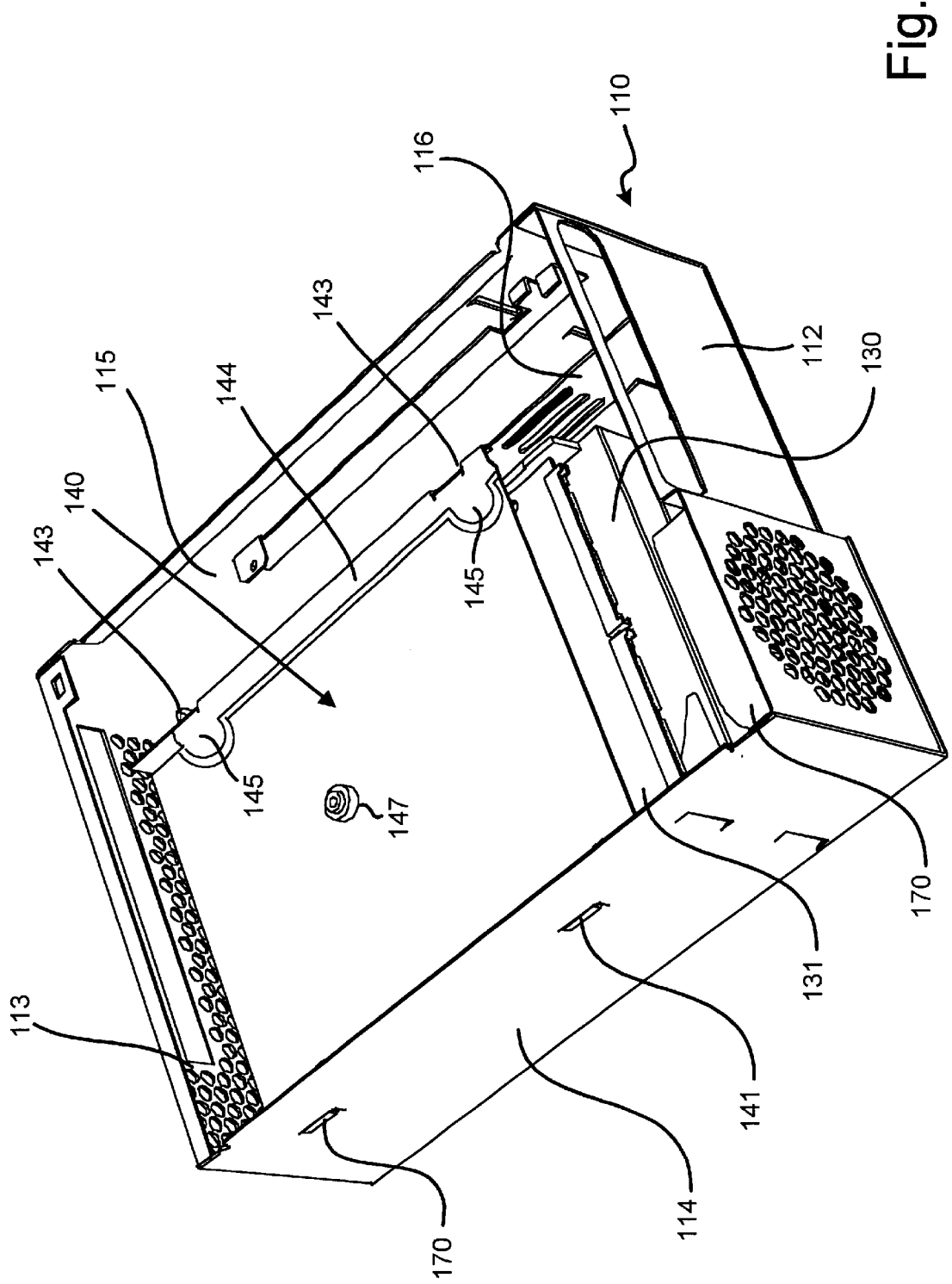
FIG. 3 shows a partially assembled integrated computer module with emphasis on the intermediate plate and its interconnection to the tub.

FIG. 3 shows the intermediate plate 140 and its interconnection to the tub 110 in more detail. As shown therein, the intermediate plate 140 has a central section, a front edge, a back edge opposite the front edge, a first side edge, and a second side edge opposite the first side edge. The preferred intermediate plate 140 has a pair of tabs 141 on its first side edge which interface with a corresponding pair of slots (not numbered) in the first side wall 114. The second side of the plate includes a pair of downwardly-extending fingers 143 that mate with one side of the intermediate wall 116 and an elongated lip 144 that mates with an opposite side of the intermediate wall 116. The downwardly-extending fingers 143 have detents (see FIG. 4) which mate with slots (not shown) in the intermediate wall 116.

Figure 4:
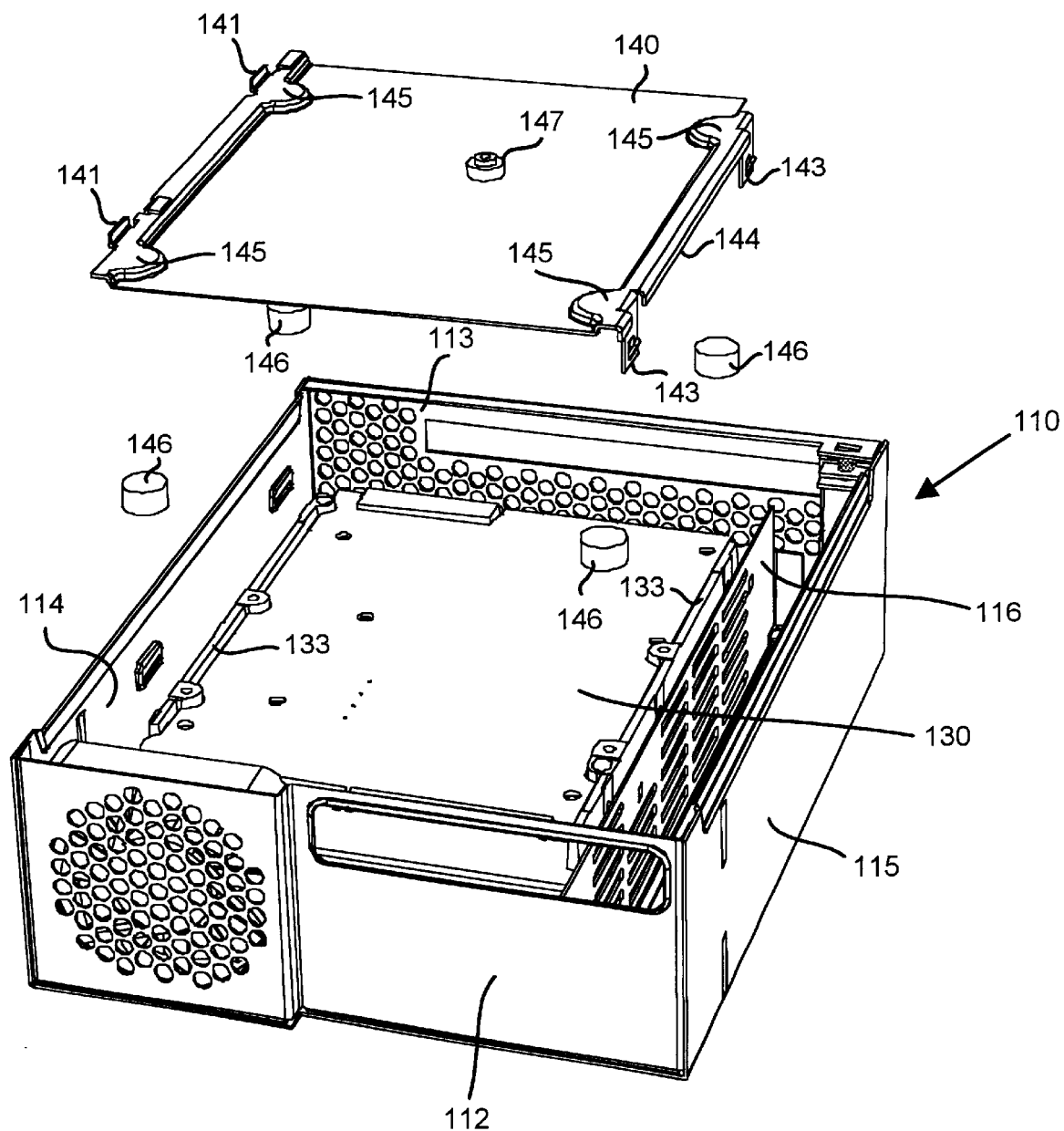
FIG. 4 is an exploded view of the integrated computer module of FIG. 3.

FIG. 4 is an exploded view of FIG. 3 showing the preferred interconnection between the intermediate plate 140 and the disk drive 130 in the tub 110. As shown, the intermediate plate 140 does not make direct contact with the disk drive 130. Instead, four upper shock mounts 146 are bonded or otherwise attached to corresponding wells 145 in the intermediate plate 140. The disk drive 130, therefore, is encased and elastomerically supported between the tub 110 and the intermediate plate 140 by the lower shock mounts 126 (see FIG. 2) and the upper shock mounts 146.

As best shown in FIG. 2, the main PCBA 150 is secured in the tub 110 above the intermediate plate 140. In the presently preferred embodiment, the main PCBA 150 is secured with two screws (not shown) that pass downward through two apertures—a central aperture 155 and a side aperture 159. The central screw mates with a threaded aperture in the top of a standoff (not shown) that has a threaded fastener that extends from its bottom and is screwed into a threaded boss 147 (see FIG. 4) in the center of the intermediate plate 140. The side screw mates with a threaded aperture in the top of a similar standoff (also not shown) that screws into a threaded aperture located at one end of a shelf bracket (not shown) that is welded to the second side wall 115 of the tub 110. The other end of the preferred shelf bracket has outwardly extending, vertically spaced fingers (not shown) that surround the top and bottom of the main PCBA 150 and thereby secure it at a third location. It is important, of course, to ground the main PCBA 150. The preferred standoffs are conductive and make contact with corresponding traces that surround the main PCBA's central and side apertures to provide such grounding.

The main PCBA 150 may be divided into two upper portions and two lower portions. The upper left half of the main PCBA 150 carries the CPU and its heat sink 153. The upper right half carries a standard pair of PCM connectors 158 for interfacing the PCBA 150 with any PCM expansion card 160 that may be present. The majority left portion of the lower side of the main PCBA 150 rests closely against the intermediate plate 140 via support tabs 142 located to either side thereof and via a conductive standoff located near the plate's center (not shown). This portion of the PCBA's underside may carry some low-profile components, but it does not have any extending components due to its close proximity to the intermediate plate 140. The minority right portion of the main PCBA's underside, however, carries a pair of memory sockets 156 that support a pair of memory modules 157 which extend downwardly therefrom next to the disk drive 130, in-between the intermediate wall 116 and the second side wall 115. An aperture (not shown) and associated cover plate 158 are provided on the tub's floor wall 111 and aligned with the memory modules 157 to provide access to the modules after the ICM 100 has been assembled.

The provision of highly efficient cooling is important because of the high power dissipation and component density in the relatively low volume of the ICM 100. Modern CPUs dissipate a significant amount of heat. For example, an Intel Pentium III processor operating at 500 MHz with a 512 K L2 cache dissipates about 28 watts. The safe dissipation of this much heat requires a large, highly efficient heat sink 153, the preferred heat sink being fabricated from aluminum because aluminum offers a good compromise between heat dissipation and cost. The safe dissipation of this much heat also requires that cooling air pass over the heat sink's cooling fins (not numbered) at relatively high velocity, requiring at least 300 linear feet per minute (LFM). The air velocity at the heat sink is, of course, a function of the fan's volumetric output rate, the area of its exit aperture, and any leakage or airflow resistance that may be present. Chassis mounted cooling fans are available with airflow rates exceeding 200 cubic feet per minute (CFM). Given the advent of higher power CPU's and the endless variety of chassis designs, chassis mounted fans are sometimes supplemented by dedicated CPU fans. Dedicated CPU fans guarantee adequate air flow over the CPU. Because of their immediate proximity to the component to be cooled, they tend to have lower airflow rates of 5 to 15 CFM. Considering both of these fan variants as a group, the cooling fan used in the typical PC has an airflow rate from about 5 to 200 CFM. In either case, the larger, more powerful fans that provide the highest air volume are generally more costly and louder than their less capable counterparts.

Figure 5:
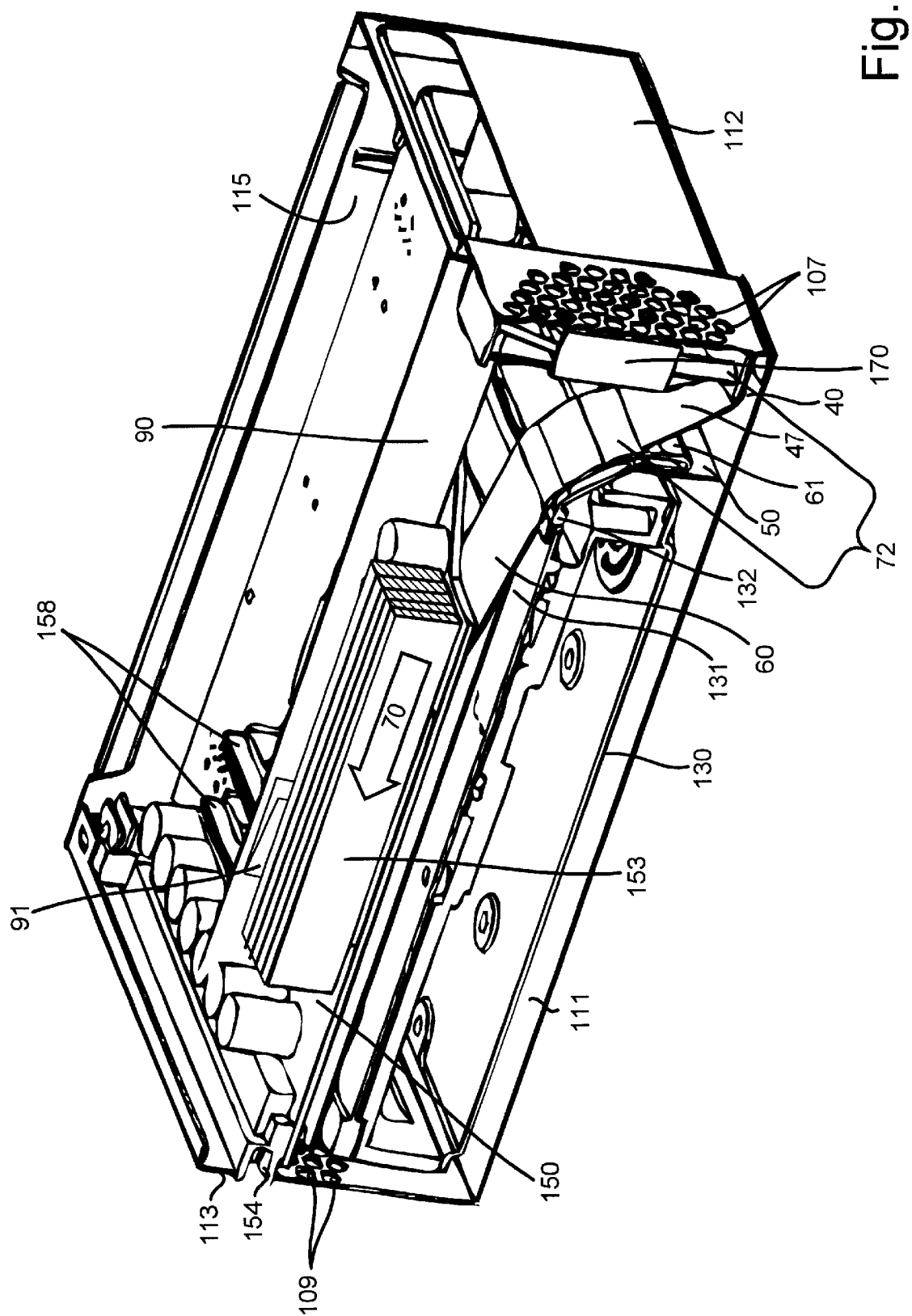
FIG. 5 is a cross-sectional view of the ICM of FIG. 1 (with the cover removed and the PCM card absent) showing a preferred cooling tunnel for efficiently cooling the ICM's microprocessor.
Figure 6:
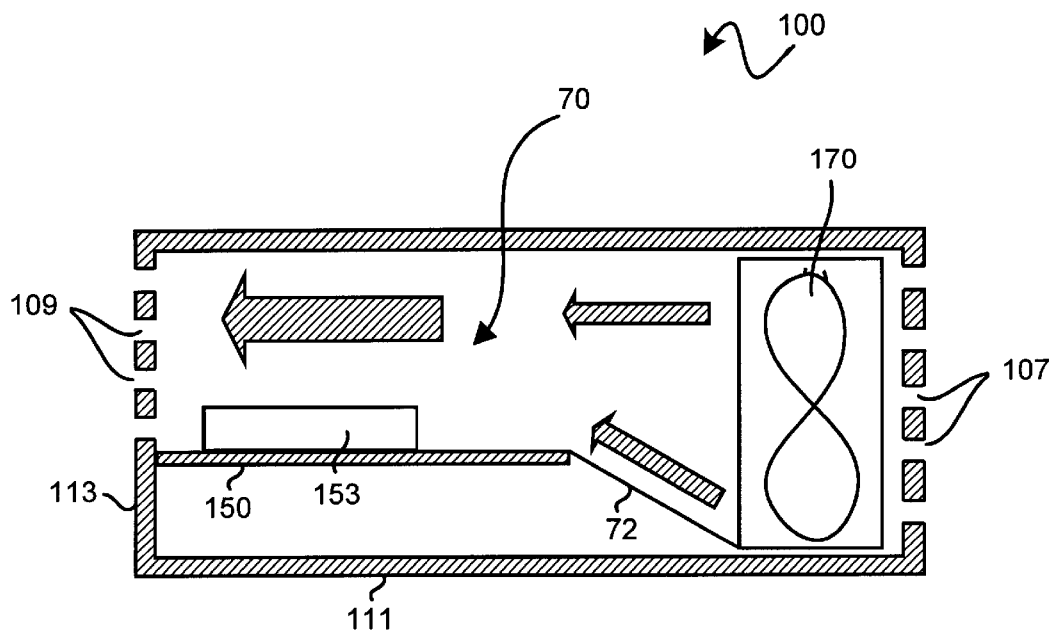
FIG. 6 is a simplified schematic view of the cooling tunnel of FIG. 5.
Figure 7:
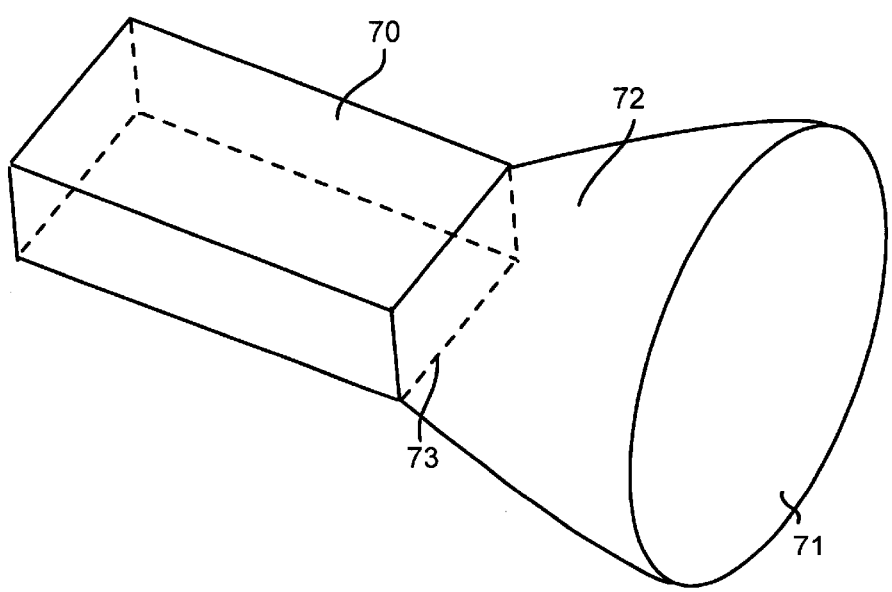
FIG. 7 is a further simplified view of the cooling tunnel of FIG. 5 with emphasis on the tapering section which accelerates cooling air into the tunnel.

If the cooling fans being considered for use push cooling air out an exit aperture with an area of about 6 square inches or about 0.04 square feet, and assuming a range of 5 to 50 CFM, the available cooling fans provides a corresponding linear velocity of 125 to 1,250 linear feet per minute (LFM) at the exit aperture. This is the measurement that translates to effective cooling of the heat sink 153. Given cost and noise considerations, one would choose the lowest possible rate fan that provides the desired linear velocity. FIGS. 5–7 relate to a unique cooling tunnel 70 and associated structure for accelerating cooling air within the cooling tunnel 70 to permit the ICM 100 to use a smaller, quieter, less costly fan than would otherwise be required as follows.

The ICM's built-in cooling fan 170 is preferably located next to the front wall 112 of the tub 110, next to the front cooling apertures 107, so that it has access to a continuous supply of relatively cool air. The fan 170, with the help of unique accelerating structure, moves air through the cooling tunnel 70, over the fins of the heat sink 153, with a velocity of greater than 300 linear feet per minute (LFM).

The preferred airflow structure is best shown in FIGS. 5, 6 and 7. As shown therein, the main PCBA 150 is designed so that the CPU's heat sink 153 extends upwardly into the "cooling tunnel" 70 located between the front and rear cooling apertures 107,109 in the tub's front and back walls. The cooling fan 170 has an exit profile of a first area 71. The accelerating structure comprises a tapering means 72 for accelerating the air flowing from the fan's exit profile of first area 71 into the cooling tunnel 70 which has a tunnel profile of a second smaller area 73. The velocity of the cooling air is thereby accelerated within the tapering means 72 until it enters the cooling tunnel 70 at maximum velocity. The amount of acceleration is approximately determined by the ratio between the first and second areas 71, 73. The "approximate" qualifier is appropriate with respect to the preferred embodiment because the cooling tunnel 70 and the tapering means 72 are built from other components such that they are not completely airtight or completely smooth.

The cooling tunnel 70 could be an integral or discrete structure that is separable from other ICM components. As just mentioned, however, the preferred cooling tunnel 70 is formed from the physical arrangement of several existing components. A bottom of the tunnel 70 is defined by the upper surface of the main PCBA 150. A top of the tunnel 70 is defined by the ceiling wall 119. A first side of the tunnel 70 is defined by the tub's first side wall 114. Finally, a second side of the tunnel 70 may be defined by a special partition member 90. In this fashion, the aforementioned components form a cooling tunnel 70 that axially surrounds the CPU's heat sink 153. The partition member 90 may have an optional diverter flap 91 which diverts some of the accelerated cooling air passing through the cooling tunnel 70 into other areas of the ICM 100.

The tapering means 72 can also take on a number of arrangements. The preferred tapering means 72, however, is an air ramp 72 which tapers upward from a bottom of the fan 170 toward the main PCBA 150 as shown in FIGS. 5 and 6. The air ramp 72 may be an integral member. In the preferred embodiment, however, the air ramp 72 comprises the flexible conductive assembly 60 (e.g. ribbon cable) which connects the main PCBA 150 to the disk drive 130. In more detail, a first end of the ribbon cable 60 is connected to the main PCBA 150 and a second end of the ribbon cable 60 is connected to the controller PCBA 131. Both connections are made adjacent the cooling fan's exit profile 71. The ribbon cable 60 is folded back between its first and second ends to form a folded portion 61 and the folded portion is held down near the cooling fan 170 such that an upper surface of the folded portion 61 extends downwardly from the main PCBA 150 toward a bottom of the cooling fan 170. The ribbon cable 60 is preferably held down by a hold-down ramp 47 which extends from the bottom of a fan bracket 40 welded into the tub 110. The hold-down ramp 47 does not have to extend from the fan bracket 40, but could instead extend from the tub 110 per se or extend from the front drive wall 50.

B. The Host Assembly—Generally

Figure 10:
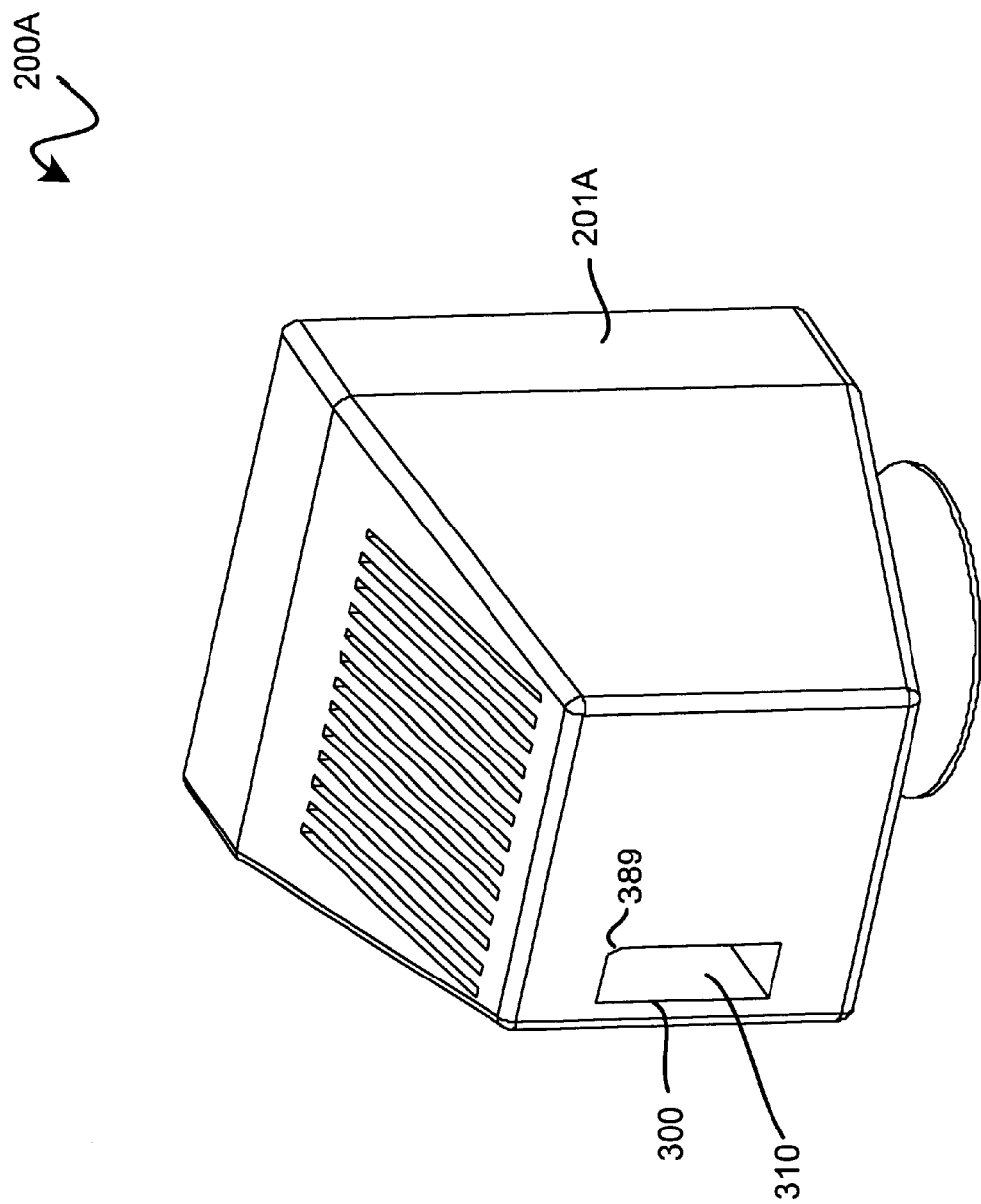
FIG. 10 is a rear perspective view of a host assembly that contains a CRT display and is configured to appear like a conventional CRT monitor.
Figure 11:
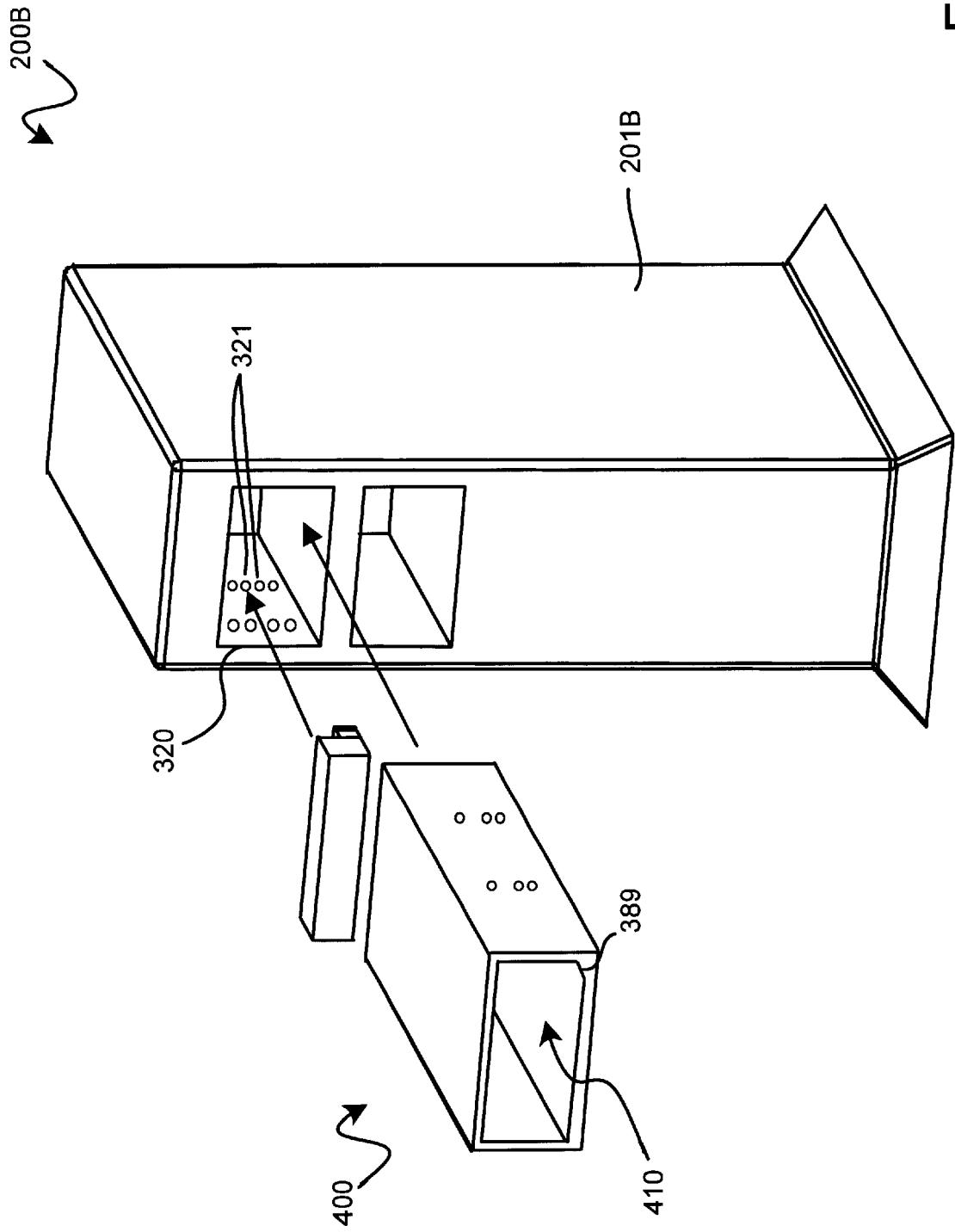
FIG. 11 is a front perspective view of a host assembly configured to appear like a conventional tower chassis that may be connected to a monitor, a keyboard, and a mouse (not shown)

FIGS. 10 and 11 show two host assemblies 200A, 200B. Both assemblies contain a power supply (not shown) for providing power to the host assembly and to the ICM 100 inserted therein. The first preferred host assembly 200A of FIG. 10 contains a CRT display and is configured to appear like a conventional CRT monitor 201A. The second preferred host assembly 200B of FIG. 11 is configured to appear like a conventional full-height tower chassis 201B that has a conventional disk drive bay 320 and may be connected to a display, a keyboard, and a mouse (not shown). Other configurations are possible. These two are merely illustrative examples.

The preferred host assembly provides a docking bay that defines a cavity for receiving an ICM 100. It is possible, however, to provide a docking module (not shown) that releasably connects an ICM 100 to other devices without providing a cavity 310 per se.

The FIG. 10 host assembly 200A uses a "built-in" docking bay 300 and associated cavity 310 having keying feature 389 for mating with module keying feature 189. In operation, the user inserts the ICM 100 of FIG. 1 into the cavity 310 until the ICM's module connector 154 (see FIG. 8) mates with a host connector 254 (shown in FIG. 12) at the rear of the cavity 310.

The FIG. 11 host assembly 200B, on the other hand, uses a "retrofit" docking bay adapter 400 that fits in a standard disk drive bay 320 and defines a cavity 410 having a host connector (not shown) and the keying feature 389 for receiving an ICM 100. The cavity 410 in the retrofit adapter 400 also provides a host connector 254 (shown in FIG. 12) such that the user may insert the ICM 100 into the cavity 410.

C. The Host Assembly—Bay Details

Figure 12:
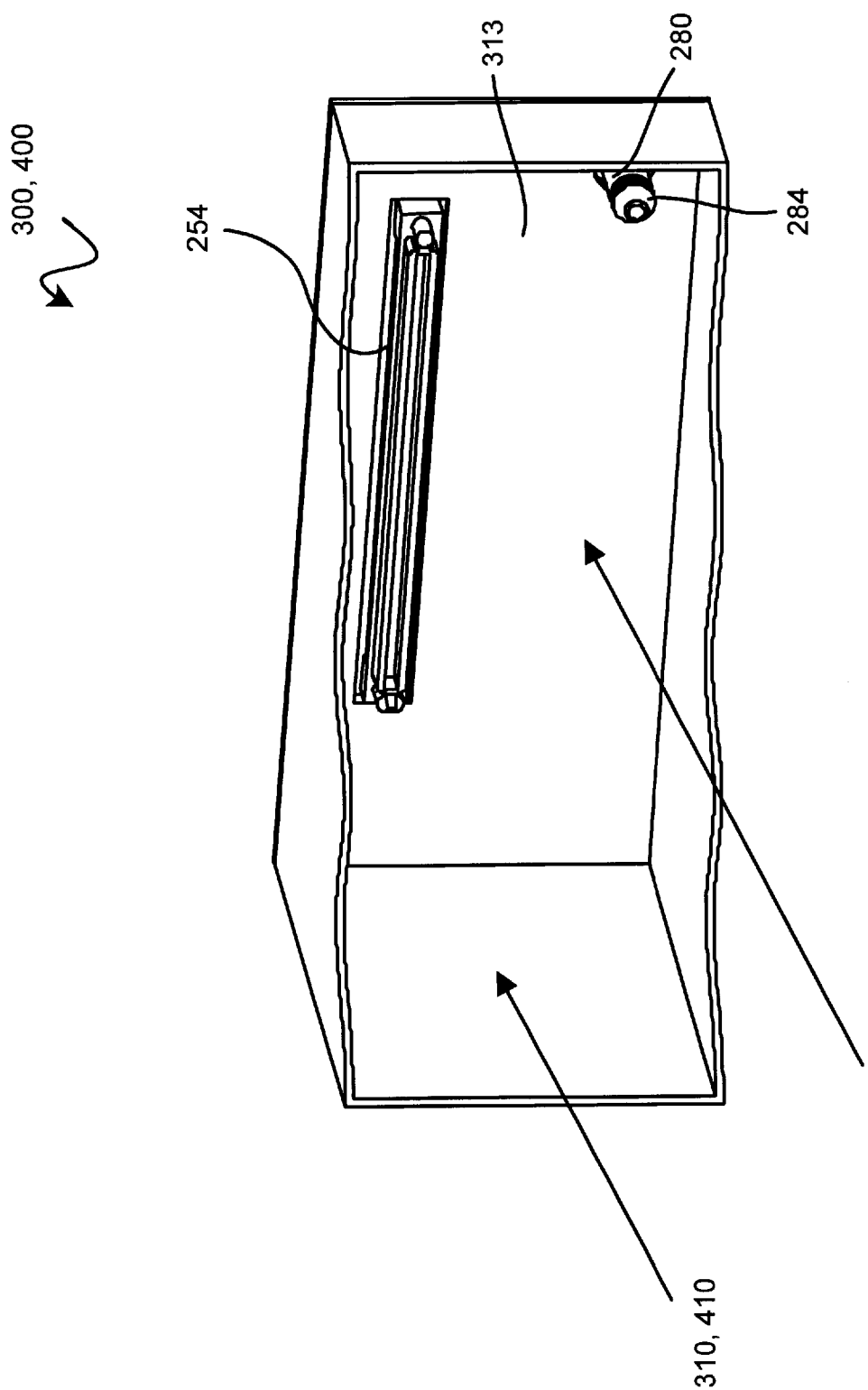
FIG. 12 is a generalize cutaway view of a docking bay according to this invention, suitable for use in a host assembly like those illustrated in FIGS. 10 and 11 and configured to receive, electrically mate with, and retain an integrated computer module like the one shown in FIG. 1.

FIG. 12 is a generalize cutaway view of a built-in docking bay 300 or retrofit adapter 400 according to this invention, the docking bay suitable for use in a host assembly 200A, 200B like those illustrated in FIGS. 10 and 11 and configured to receive, electrically mate with, and retain an ICM 100 like the one shown in FIG. 1.

The docking bay has a cavity 310 defined by a continuous periphery, preferably rectangular, extending from a front opening (not separately numbered) to a back end 313 opposite the front opening. The cavity 310 may be regarded as having an insertion axis (arrow) that is perpendicular to the periphery. Two items of interest are located at the back end 313 of the cavity 310: a host connector 254 for mating with the module connector 154 and a projecting member 280 for providing a data security function and an alignment function.

The host connector 254 is located a particular XY (horizontal and vertical coordinate reference) connector location at the back end 313 of the cavity 310 so that it mates with the ICM's module connector 154 located at the same XY connector location when the ICM 100 is inserted into the cavity 310. The host connector 254 may be centered on the back end 313 of the cavity, but the XY connector location is preferably asymmetric so that, in the absence of a key feature 189, mating only occurs if the ICM 100 is in the "correct" orientation.

The projecting member 280 extends into the cavity 310 in parallel with the insertion axis so that it may be received in a corresponding aperture 80 in the rear wall 113 of the ICM 100. The projecting member 280 may be located at an asymmetric XY location at the back end 313 of the cavity to prevent the user from fully inserting an unkeyed ICM 100 into the cavity 310 in the wrong orientation. In either case, the preferred projecting member 280 is located at the lower right corner of the cavity's back end 313 so that the ICM 100 may conveniently receive it near the ICM's second side 115 (see FIG. 2). Other locations are possible.

If the ICM 100 and docking bay 300, 400 are keyed, then the projecting member 280 will always mate with the aperture 80 in the rear wall 113 of the ICM 100. In this preferred embodiment, the projecting member 280 provides a guiding function and a locking function, but it does not impact the ICM 100 because misalignment is not possible.

In the case of an un-keyed ICM 100, however, alignment is not assured. If the un-keyed ICM 100 is inserted in the correct orientation where the connectors 154, 254 are aligned for mating, then the projecting member 280 is simply received by the module aperture 80 in the rear wall 113 of the ICM's tub 110 (see FIG. 2). If the un-keyed ICM 100 is inserted upside down, however, then a solid portion of the rear wall 113 will contact the projecting member 280 before the ICM's rear wall 113 contacts and potentially damages the host connector 254 and before the cavity's rear end 313 contacts and potentially damages the module connector 154.

Figure 13:
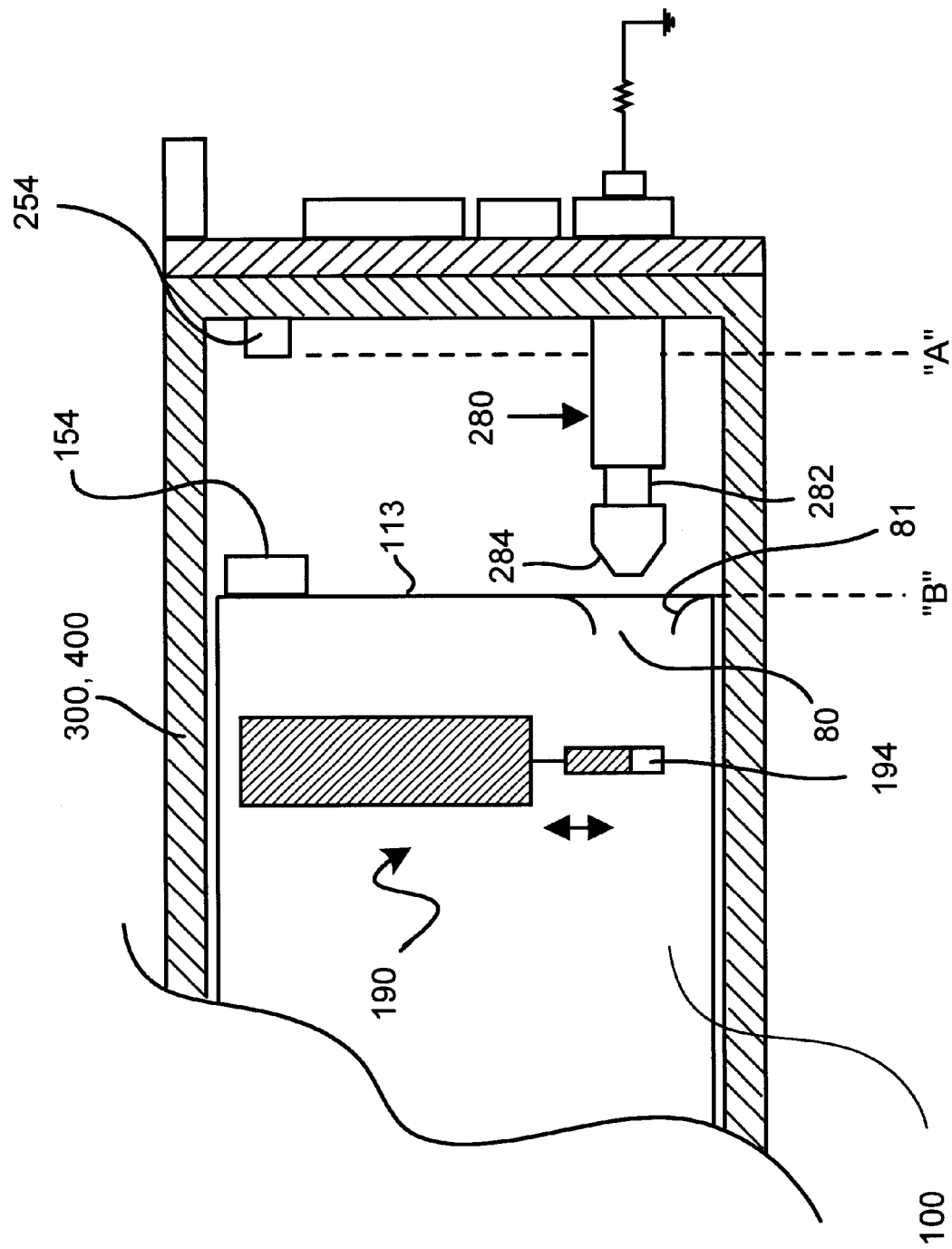
FIG. 13 is a cutaway plan view of the integrated computer module partially inserted into a host assembly to illustrate engagement with the projecting member.

FIG. 13 shows the ICM 100 partially inserted into the docking bay 300, 400. Note that the projecting member 280 extends beyond position "A," i.e beyond the farthest most point of the host connector 254. This length ensures that the projecting member 280 contacts the ICM's rear wall 113 before the host connector 254 contacts the rear wall 113 if the ICM is inserted upside down.

The projecting member 280 also provides an alignment function that is best understood with reference to FIGS. 12 and 13. As shown, the preferred projecting member 280 has an annular taper 284 at its tip that slidably mates with the radius edge 81 of the module aperture 80. The radius edge 81 essentially defines an annular beveled recess that guides the module aperture 80 onto the projecting member 280, and thereby further aligns the overall ICM 100 for mating the module connector 154 to the host connector 254. The projecting member 280 must extend beyond position "A," however, if it also to provide such an alignment function in cooperation with the module aperture 80. As shown, in fact, the preferred projecting member 280 extends beyond reference position "A" to a farther reference position "B" to ensure that the module aperture 80 envelopes the projecting member 280 before the module connector 154 begins to mate with the host connector 254. A benefit of this additional length is that ICM 100 contacts the projecting member 280 well before the position that the ICM 100 ordinarily sits when mounted in the bay. Accordingly, the user is given very obvious feedback, both tactile and visual, that the ICM 100 is not corrected situated.

Suitably, the preferred connectors 154, 254 themselves include further complementary alignment features to ensure that a truly "blind" insertion is possible. A wide variety of cooperating connector styles may be used, including but not limited to, pin and socket types, card edge types, and spring contact types.

Although not shown, the inventors contemplate an alternative embodiment of the ICM 100 that is secured to a host assembly in a semi-permanent arrangement. For cost reasons, the semi-permanent embodiment would omit the sleeve 180 and associated faceplate 181 and would replace the blind mating connector 154 with a more cost effective PCBA edge connector having conductive fingers made plated with minimal amounts of gold.

FIGS. 12 and 13 also show that the projecting member 280 provides a data integrity feature in connection with the locking mechanism 190 contained inside of the ICM 100. The projecting member 280, in particular, includes a retention notch 282 located on the side thereof. The preferred retention notch 282 is provided in the form of an annular groove 282 that encircles the entire projecting member 280 and the preferred locking mechanism 190 includes a moveable pawl 194 that locks the ICM 100 into the docking bay 300, 400 by engaging the projecting member's annular groove 292.

The preferred projecting member 280 is made of a conductive material and is grounded so that it may serve as a means for managing ESD. It is generally desirable to discharge electrostatic energy through a resistance to reduce the magnitude of an associated current spike. Accordingly, the projecting member 280 itself may be comprised of a moderately conductive material such as carbon impregnated plastic or the projecting member 280 may be made of a highly conductive material such as metal and connected to ground through a discharge resistor as shown in FIG. 13. In either case, the desired resistance is about 1–10 megohms.

FIGS. 14–17 show a presently preferred construction for a "retrofit" docking bay adapter 400 as might be used in the standard drive bay 230 in the host assembly 200B of FIG. 11. As shown, the retrofit adapter 400 comprises an adapter sleeve 420 and an adapter PCB 430 that is mounted to a back end of the adapter sleeve. The adapter sleeve 420 includes a suitable means for mounting to a standard drive bay 320 such as, for example, a plurality of threaded mounting holes 421 that are sized and spaced to interface with screws and corresponding through holes 321 (see FIG. 11) in a standard 5 ¼" drive bay 320. The preferred adapter sleeve 420 is formed of injection molded plastic. It includes a number of openings 425, therefore, to reduce the required amount of plastic material.

The adapter PCB 430, shown from the rear in FIG. 14 and from the side in FIG. 15, carries the host connector 254, the projecting member 280, and suitable circuitry 434 for interfacing the adapter PCB 430 to other components in the host adapter.

FIG. 18 is a side view of a preferred structure for supporting the host connector 254. Here, instead of being supported on a separate PCB 430 as in FIGS. 14 and 15, the host connector 254 is incorporated into the edge of a main host PCB 250 in order to simply the construction and reduce costs. FIG. 18 shows such structure in connection with an adapter sleeve 400, but is probably more applicable for use with a "custom" built-in docking bay 300 as used in a host assembly 200A like that shown in FIG. 10, where more control can be exercised over the construction of the main host PCB 250 contained in the host assembly 200A.

We claim:

1. An integrated computer module adapted for removable insertion into a docking bay within a host assembly, and upon such insertion for connecting to a host computer, the integrated computer module comprising:

an enclosure defined by a front wall, a back wall opposite the front wall, a first side wall, a second side wall opposite the first side wall, a floor wall, and a ceiling wall;

a main printed circuit board assembly (main PCBA) located in the enclosure, the main PCBA including a microprocessor dissipating heat;

a module connector electrically connected to the main PCBA and supported at the enclosure's back wall for connection to the host connector upon insertion of the integrated module into the docking bay in the host assembly;

a plurality of front and back cooling apertures in the front and back walls of the enclosure, respectively;

a cooling tunnel located between the plurality of front and back cooling apertures;

a cooling fan located adjacent to the plurality of front cooling apertures, the cooling fan having an exit profile of a first area, the cooling tunnel having a tunnel profile of a second area that is smaller than the first area of the fan's exit profile;

tapering means for accelerating cooling air that is flowing from the fan's exit profile into the cooling tunnel;

a heat sink bonded to the microprocessor and extending upward therefrom into the cooling tunnel through which the accelerated cooling air is passing;

a disk drive including a case and a controller PCBA mounted on one side of the casing, the main PCBA and the disk drive being in a stacked arrangement with one another; and a conductor assembly electrically connecting the main PCBA to the controller PCBA, wherein the tapering means for accelerating cooling air that is flowing from the fan's exit profile into the cooling tunnel comprises the conductor assembly.

2. The integrated computer module of claim 1 wherein the conductor assembly is flexible.

3. The integrated computer module of claim 2 wherein the conductor assembly is a ribbon cable.

4. The integrated computer module of claim 1 wherein the conductor assembly forms an air ramp extending between the cooling fan and the cooling tunnel.

5. The integrated computer module of claim 4 wherein a first end of the conductor assembly is connected to the main PCBA adjacent to the cooling fan's exit profile and a second end of the conductor assembly is connected to the controller PCBA adjacent to the cooling fan's exit profile, wherein the conductor assembly is folded back between its first and second ends to form a folded portion, wherein an upper surface of the folded portion extends downwardly from the edge of the main PCBA toward a bottom of the cooling fan, and wherein a terminal end of the folded portion is secured near the bottom of the fan.

6. The integrated computer module of claim 5 wherein the terminal end of the folded portion is secured beneath a ramp member extending upward from adjacent the bottom of the fan.

7. The integrated computer module of claim 6 wherein the ramp member is integrally formed with a cooling fan bracket that receives the cooling fan.

8. The integrated computer module of claim 6 wherein the ramp member is mounted to the floor wall adjacent to the cooling fan.

9. The integrated computer module of claim 1 wherein the disk drive is oriented such that its controller PCBA is facing the main PCBA to reducce the length of the conductor assembly and minimize signal degradation.

10. The integrated computer module of claim 1 further comprising an intermediate plate including a central section, a front edge, a back edge opposite the front edge, a first side edge, and a second side edge opposite the first side edge, the intermediate plate located between the disk drive's controller PCBA and the main PCBA, and attached to the enclosure to capture the disk drive in the enclosure and to insulate the controller PCBA from EMI generated by the main PCBA.

11. The integrated computer module of claim 10 wherein the disk drive is below the main PCBA and wherein the intermediate plate is located above the disk drive.

12. The integrated computer module of claim 10 wherein the enclosure further comprises an intermediate wall between the first side wall and the second side wall and wherein the intermediate plate's first side edge is attached to the enclosure's first side wall and wherein the intermediate plate's second side edge is attached to the enclosure's intermediate wall.

13. The integrated computer module of claim 10 further comprising a gap between the enclosure's front wall and the front edge of the Intermediate plate, and wherein the conductor assembly electrically connecting the main PCBA to the controller PCBA passes through the gap.

14. The Integrated computer module of claim 1 wherein the cooling tunnel comprises a surface of the main PCBA.

15. The integrated computer module of claim 14 wherein the cooling tunnel further comprises the ceiling wall.

16. The integrated computer module of claim 15 wherein the cooling tunnel further comprises the first side wall.

17. The integrated computer module of claim 16 wherein the cooling tunnel further comprises a partition member with a vertical dimension that extends substantially between the main PCBA and the ceiling wall and a horizontal dimension that extends substantially between the front wall and the back wall.

18. The integrated computer module of claim 17 wherein the partition member further comprising a diverter flap extending from the partition member into the cooling tunnel for directing part of the accelerated cooling air in the cooling tunnel to other areas in the integrated computer module.

19. The integrated computer module of claim 18 wherein the diverter flap is located on the partition member near the back wall of the enclosure, the accelerated cooling air in the cooling tunnel passing over a substantial portion of the heat sink bonded to the microprocessor before being diverted.

20. An integrated computer module adapted for removable insertion into a docking bay within a host assembly, and upon such insertion for connecting to a host computer, the integrated computer module comprising:

an enclosure defined by a front wall, a back wall opposite the front wall, a first side wall, a second side wall opposite the first side wall, a floor wall, and a ceiling wall;

a main printed circuit board assembly (main PCBA) located in the enclosure, the main PCBA including a microprocessor dissipating heat;

a module connector electrically connected to the main PCBA and supported at the enclosure's back wall for connection to the host connector upon insertion of the integrated module into the docking bay in the host assembly;

plurality of front and back cooling apertures in the front and back walls of the enclosure, respectively;

a cooling tunnel located between the plurality of front and back cooling apertures, the cooling tunnel being defined by the main PCBA, the ceiling wall, the first side wall, and a partition member with a vertical dimension that extends substantially between the main PCBA and the ceiling wall and a horizontal dimension that extends substantially between the front wall and the back wall;

a cooling fan located adjacent to the plurality of front cooling apertures, the cooling fan having an exit profile of a first area, the cooling tunnel having a tunnel profile of a second area that is smaller than the first area of the fan's exit profile;

tapering means for accelerating cooling air that is flowing from the fan's exit profile into the cooling tunnel;

a heat sink bonded to the microprocessor and extending upward therefrom into the cooling tunnel through which the accelerated cooling air is passing;

a disk drive including a casing and a controller PCBA mounted on one side of the casing, the main PCBA and the disk drive being in a stacked arrangement with one another; and a conductor assembly electrically connecting the main PCBA to the controller PCBA, wherein the tapering means for accelerating cooling air that is flowing from the fan's exit profile into the cooling tunnel comprises the conductor assembly.

21. The integrated computer module of claim 20 wherein the conductor assembly is flexible.

22. The integrated computer module of claim 21 wherein the conductor assembly is a ribbon cable.

23. The integrated computer module of claim 20 wherein the conductor assembly forms an air ramp extending between the cooling fan and the cooling tunnel.

24. The integrated computer module of claim 23 wherein a first end of the conductor assembly is connected to the main PCBA adjacent to the cooling fan's exit profile and a second end of the conductor assembly is connected to the controller PCBA adjacent to the cooling fan's exit profile, wherein the conductor assembly is folded back between its first and second ends to form a folded portion, wherein an upper surface of the folded portion extends downwardly from the edge of the main PCBA toward a bottom of the cooling fan, and wherein a terminal end of the folded portion is secured near the bottom of the fan.

25. The integrated computer module of claim 24 wherein the terminal end of the folded portion is secured beneath a ramp member extending upward from adjacent the bottom of the fan.

26. The integrated computer module of claim 25 wherein the ramp member is integrally formed with a cooling fan bracket that receives the cooling fan.

27. The integrated computer module of claim 25 wherein the ramp member is mounted to the floor wall adjacent to the cooling fan.

28. The integrated computer module of claim 20 wherein the disk drive is oriented such that its controller PCBA is facing the main PCBA to reduce the length of the conductor assembly and minimize signal degradation.

29. The integrated computer module of claim 20 further comprising an intermediate plate including a central section, a front edge, a back edge opposite the front edge, a first side edge, and a second side edge opposite the first side edge, the intermediate plate located between the disk drive's controller PCBA and the main PCBA and attached to the enclosure to capture the disk drive in the enclosure and to insulate the controller PCBA from EMI generated by the main PCBA.

30. The integrated computer module of claim 29 wherein the disk drive is below the main PCBA and wherein the intermediate plate is located above the disk drive.

31. The integrated computer module of claim 29 wherein the enclosure further comprises an intermediate wall between the first side wall and the second side wall and wherein the intermediate plate's first side edge is attached to the enclosure's first side wall and wherein the intermediate plate's second side edge is attached to the enclosure's intermediate wall.

32. The integrated computer module of claim 29 further comprising a gap between the enclosure's front wall and the front edge of the Intermediate plate, and wherein the conductor assembly electrically connecting the main PCBA to the controller PCBA passes through the gap.

33. The integrated computer module of claim 20 wherein the partition member further comprising a diverter flap extending from the partition member into the cooling tunnel for directing part of the accelerated cooling air in the cooling tunnel to other areas in the integrated computer module.

34. The integrated computer module of claim 33 wherein the diverter flap is located on the partition member near the back wall of the enclosure, the accelerated cooling air in the cooling tunnel passing over a substantial portion of the heat sink bonded to the microprocessor before being diverted.

35. An integrated computer module adapted for removable insertion into a docking bay within a host assembly, and upon such insertion for connecting to a host computer, the integrated computer module comprising:
   an enclosure defined by a front wall, a back wall opposite the front wall, a first side wall, a second side wall opposite the first side wall, a floor wall, and a ceiling wall;
   a main printed circuit board assembly (main PCBA) located in the enclosure, the main PCBA including a microprocessor dissipating heat;
   a module connector electrically connected to the main PCBA and supported at the enclosure's back wall for connection to the host connector upon insertion of the integrated module into the docking bay in the host assembly;
   a plurality of front and back cooling apertures in the front and back walls of the enclosure, respectively;
   a cooling tunnel located between the plurality of front and back cooling apertures;
   a cooling fan located adjacent to a plurality of cooling apertures, the cooling fan having an exit profile of a first area and the cooling tunnel has a tunnel profile of a second area that is smaller than the fan's exit profile;
   tapering means for accelerating cooling air that is flowing from the fan's exit profile into the cooling tunnel;
   heat sink bonded to the microprocessor and extending upward therefrom into the cooling tunnel through which the accelerated cooling air is passed;
   a disk drive including a case and a controller PCBA mounted on one side of the casing, the main PCBA and the disk drive being in a stacked arrangement with one another; and
   a conductor assembly electrically connecting the main PCBA to the controller PCBA,
   wherein the tapering means for accelerating cooling air that is flowing from the fan's exit profile into the cooling tunnel comprises the conductor assembly.

36. The integrated computer module of claim 35 wherein the conductor assembly is a ribbon cable.

* * * * *